(12) United States Patent
Sorensen et al.

(10) Patent No.: US 8,873,794 B2
(45) Date of Patent: Oct. 28, 2014

(54) STILL IMAGE SHOPPING EVENT MONITORING AND ANALYSIS SYSTEM AND METHOD

(75) Inventors: Herb Sorensen, Troutdale, OR (US); David Albers, Gresham, OR (US); Mark A. Byram, Estacada, OR (US); Michael D. Gibney, Troutdale, OR (US); Michael S. Wynne, Kennewick, WA (US)

(73) Assignee: Shopper Scientist, LLC, Corbett, OR (US)

( * ) Notice: Subject to any disclaimer, the term of this patent is extended or adjusted under 35 U.S.C. 154(b) by 1154 days.

(21) Appl. No.: 12/030,132

(22) Filed: Feb. 12, 2008

(65) Prior Publication Data

US 2008/0215462 A1 Sep. 4, 2008

Related U.S. Application Data

(60) Provisional application No. 60/889,519, filed on Feb. 12, 2007.

(51) Int. Cl.

| G06K 9/00 | (2006.01) |
| G06Q 10/08 | (2012.01) |
| G06Q 30/06 | (2012.01) |
| G06Q 10/06 | (2012.01) |
| G06Q 10/00 | (2012.01) |

(52) U.S. Cl.
CPC .............. *G06Q 10/06* (2013.01); *G06Q 10/087* (2013.01); *G06Q 30/06* (2013.01); *G06K 9/00771* (2013.01)
USPC ............................................ 382/100; 705/28

(58) Field of Classification Search
CPC . G06K 9/00771; G06K 9/38; G06K 9/00664; G06K 2009/3291; G06K 2017/0051; G06K 2017/0067; G06K 9/00711; G06K 9/3233; G06K 9/3241; G06T 2207/30241; G06T 7/2053; G06T 7/20; G06T 2207/1001
See application file for complete search history.

(56) References Cited

U.S. PATENT DOCUMENTS 5,465,115 A * 11/1995 Conrad et al. ................ 348/155
5,497,314 A * 3/1996 Novak ............................ 705/17

(Continued)

FOREIGN PATENT DOCUMENTS

GB 2428152 A * 1/2007

OTHER PUBLICATIONS

ISA US, International Search Report of PCT/US2008/001894, Jun. 20, 2008, WIPO.

*Primary Examiner* — Ryan Zeender
*Assistant Examiner* — Dana Amsdell
(74) *Attorney, Agent, or Firm* — Alleman Hall McCoy Russell & Tuttle LLP

(57) ABSTRACT

The still image shopping event analysis systems and methods provided herein may implement low frequency still image sampling and perform a computer analysis of the still images captured, including discriminating differences between frames of the still images based on changes of pixels between the frames and detecting and/or analyzing one or more shopping events based on the discriminated differences between frames of the still images. The systems and methods provided herein may further count and/or analyze the shopping events based on patterns of changes between frames, including for example, numbers of customers visiting and amounts of time customers spent visiting a shopping area, whether the visit was a transitory visit or involved more detailed shopping, whether a purchase occurred, and/or which and number of item(s) purchased.

16 Claims, 7 Drawing Sheets

(56) References Cited

U.S. PATENT DOCUMENTS

| | | | |
|---|---|---|---|
| 5,978,016 A | 11/1999 | Lourette et al. | |
| 6,128,396 A * | 10/2000 | Hasegawa et al. | 382/103 |
| 6,381,368 B1 * | 4/2002 | Kanatsu | 382/233 |
| 6,424,370 B1 * | 7/2002 | Courtney | 348/143 |
| 6,452,972 B1 | 9/2002 | Ohara | |
| 6,570,608 B1 * | 5/2003 | Tserng | 348/143 |
| 6,731,400 B1 * | 5/2004 | Nakamura et al. | 358/1.9 |
| 6,775,407 B1 * | 8/2004 | Gindele et al. | 382/166 |
| 6,785,421 B1 * | 8/2004 | Gindele et al. | 382/217 |
| 6,897,983 B1 * | 5/2005 | Kawano | 358/3.26 |
| 7,305,106 B2 * | 12/2007 | Sumitomo et al. | 382/103 |
| 7,319,479 B1 * | 1/2008 | Crabtree et al. | 348/169 |
| 7,386,170 B2 * | 6/2008 | Ronk et al. | 382/190 |
| 7,466,844 B2 * | 12/2008 | Ramaswamy et al. | 382/103 |
| 7,715,659 B2 * | 5/2010 | Zhao et al. | 382/305 |
| 7,920,717 B2 * | 4/2011 | Kansal | 382/103 |
| 2001/0004400 A1 * | 6/2001 | Aoki et al. | 382/107 |
| 2002/0159634 A1 * | 10/2002 | Lipton et al. | 382/173 |
| 2003/0002712 A1 | 1/2003 | Steenburgh et al. | |
| 2003/0098910 A1 * | 5/2003 | Kim | 348/150 |
| 2003/0235327 A1 * | 12/2003 | Srinivasa | 382/104 |
| 2004/0032494 A1 * | 2/2004 | Ito et al. | 348/152 |
| 2004/0260513 A1 * | 12/2004 | Fitzpatrick et al. | 702/182 |
| 2005/0036658 A1 * | 2/2005 | Gibbins et al. | 382/103 |
| 2005/0078325 A1 * | 4/2005 | Momose et al. | 358/1.9 |
| 2005/0104958 A1 * | 5/2005 | Egnal et al. | 348/143 |
| 2005/0105764 A1 * | 5/2005 | Han et al. | 382/100 |
| 2005/0105765 A1 * | 5/2005 | Han et al. | 382/100 |
| 2005/0146610 A1 * | 7/2005 | Creamer et al. | 348/207.1 |
| 2005/0162515 A1 * | 7/2005 | Venetianer et al. | 348/143 |
| 2005/0163345 A1 * | 7/2005 | van den Bergen et al. | 382/103 |
| 2005/0180595 A1 * | 8/2005 | Horii et al. | 382/100 |
| 2006/0013495 A1 * | 1/2006 | Duan et al. | 382/235 |
| 2006/0045381 A1 * | 3/2006 | Matsuo et al. | 382/276 |
| 2006/0147087 A1 * | 7/2006 | Goncalves et al. | 382/103 |
| 2006/0185878 A1 | 8/2006 | Soffer | |
| 2006/0218057 A1 * | 9/2006 | Fitzpatrick et al. | 705/28 |
| 2006/0227997 A1 * | 10/2006 | Au et al. | 382/103 |
| 2006/0239546 A1 | 10/2006 | Tedesco et al. | |
| 2006/0243798 A1 * | 11/2006 | Kundu et al. | 235/383 |
| 2006/0262958 A1 * | 11/2006 | Yin et al. | 382/103 |
| 2006/0291695 A1 * | 12/2006 | Lipton et al. | 382/103 |
| 2007/0058040 A1 * | 3/2007 | Zhang et al. | 348/150 |
| 2007/0223818 A1 * | 9/2007 | Marik et al. | 382/218 |
| 2007/0230798 A1 * | 10/2007 | Naylor et al. | 382/219 |
| 2007/0258202 A1 * | 11/2007 | Cooley et al. | 361/683 |
| 2008/0037869 A1 * | 2/2008 | Zhou | 382/173 |
| 2008/0077510 A1 * | 3/2008 | Dielemans | 705/28 |
| 2008/0172781 A1 * | 7/2008 | Popowich et al. | 4/476 |
| 2009/0087043 A1 * | 4/2009 | Mizushima et al. | 382/124 |

\* cited by examiner

STILL IMAGE SHOPPING EVENT MONITORING AND ANALYSIS SYSTEM AND METHOD

PRIORITY CLAIM

This application claims priority to U.S. Provisional Patent Application No. 60/889,519, filed on Feb. 12, 2007, which is hereby incorporated herein by reference.

TECHNICAL FIELD

The present invention relates generally to systems and methods for marketing analysis, and more particularly to systems and methods for monitoring and analyzing still images captured at a low frequency to detect and analyze shopping events.

BACKGROUND

In-store shopping event monitoring and analysis can provide direct evidence of shopper behavior at the point of product selection. Prior monitoring systems recorded video of shoppers, and used human operators to interpret the video. Such systems suffer from the drawback that they generate large amounts of data due to the high frame rate at which conventional video is captured, and require significant time spent by human operators to analyze the data. As a result, these systems have been costly to implement.

SUMMARY

The still image shopping event analysis systems and methods provided herein may implement low frequency still image sampling and perform a computer analysis of the still images captured. According to one aspect, the analysis may include discriminating differences between frames of the still images based on changes of pixels between the frames. According to another aspect, the analysis may include detecting and/or analyzing one or more shopping events based on the discriminated differences between frames of the still images.

The systems and methods provided herein may further count and/or analyze the shopping events based on patterns of changes between frames, including for example, numbers of customers visiting and amounts of time customers spent visiting a shopping area, whether the visit was a transitory visit or involved more detailed shopping, whether a purchase occurred, and/or the identity and number of item(s) purchased. The change of the image field measured by pixel changes may also be used to measure inventory and/or determine presence or absence of specific displays or items.

DETAILED DESCRIPTION

Figure 1:
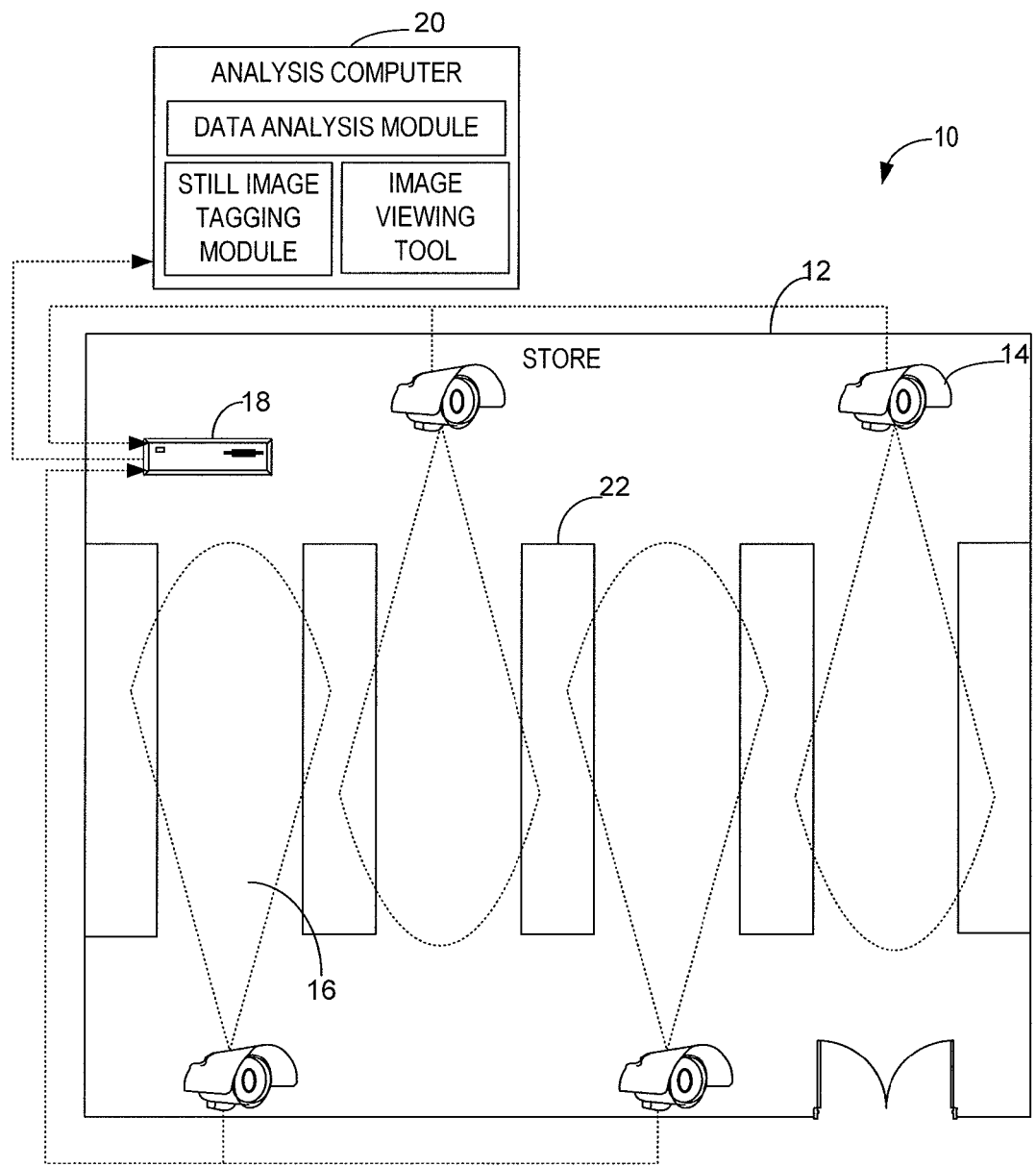
FIG. 1 is a schematic view of a shopping event monitoring and analysis system according to the present disclosure.

FIG. 1 shows a schematic view of an exemplary shopping event monitoring and analysis system 10 according to the present disclosure. This non-limiting example depicts the shopping event monitoring and analysis system 10 installed in a retail grocery store 12 for monitoring and analyzing shopping events in monitored shopping areas 16. It will be appreciated that the shopping event monitoring and analysis system 10 may be used to monitor shopping events in other shopping environments, as desired.

The system 10 may include one or more cameras 14, such as power-over-Ethernet (POE) cameras, installed to monitor the various desired shopping areas 16 in the store 12. In this example, the monitored shopping areas 16 include various aisles of the store. However, it should be appreciated that the monitored shopping areas may include a pharmacy, fresh meat counter, service deli counter, checkout area, exits and entrances, doors, or other suitable area where shopping event analysis is desired.

In some embodiments, to be deployed in locations where laws or policies regulate the placement of cameras that capture images of customers in stores, the cameras 14 may be configured to capture and store pixel array data in a form suitable for statistical analysis, but which does not retain image characteristics that would run afoul of such regulations. It will be appreciated that since the embodiments of the systems and methods described herein analyze images on a pixel by pixel basis to determine changes in the pixels between frames. Thus, these images may alternatively be referred to as pixel arrays, and these pixel arrays may only retain a portion of the information needed to reconstruct the original image. For, the pixel array may contain a pixel parameter such as luminosity data for each pixel, but not other pixel information needed to reconstruct the original image.

In some configurations, cameras may be positioned to monitor only a particular section of an aisle or other location to adjust the scope of still image analysis. For example, cameras may be positioned to capture the shelves on each side of an aisle in the store. The cameras 14 may be configured to snap, while maintained in a fixed position, still images at a low frequency rate that is lower than conventional video frame rates (approximately 30 frames per second), such as once per second, once per minute, once per hour, once per day, or less frequently.

The image data of the still images captured may be transferred for temporary storage to a computing device 18 located for example in or near the store 12, which may be referred to as "staging" the image data in a "stomp box". After staging, or in alternative to staging, the image data may be transmitted to an analysis computer 20, in some examples off site and centralized in a data center, through for example a wireless virtual private network (VPN) via the Internet. Once the image data is collected, analysis computer 20 may be configured to perform computerized analysis to discriminate shopping event information from the collected image data.

Still image data may be collected and tagged in a database, for example with date and the shopping area monitored to assist analysis. Shopping event analysis will be discussed in further detail below with reference to FIGS. 2-4.

It should be appreciated that the system 10 may include one camera in a single location or may include a plurality of cameras at numerous locations within a store. Further, a plurality of cameras may be dispersed between different store locations and may send image data to one or more data centers for analysis and storage.

The camera 14 may be positioned at various viewing angles for monitoring the desired shopping areas 16. For example, the camera 14 may be positioned to have a line of sight that is parallel to an elongate axis of the aisle, as depicted in FIG. 1, or the camera may be positioned to be perpendicular or angled relative to the axis of the aisles, depending on the desired observation area. Typically, the camera 14 is mounted in a fixed position to capture images of a fixed field of view, so that pixel changes between frames are only detected for moving objects and persons in the camera's field of view, rather than due to the camera's movement.

Various camera operating parameters may be adjusted, for data transfer, storage, processing and other purposes. For example, by reducing the sampling rate of the still images, storage capacity requirements may be reduced and/or storage resources may be made available for other uses which, in turn, may reduce overall system costs, and space requirements. As another example, by reducing image quality (i.e. pixel density) processing complexity may be reduced which may lead to a reduction in cost.

In an exemplary embodiment of the still image monitoring and analysis system 10, image analysis may be performed by the analysis computer 20 on an aggregate collection of still images to discriminate differences between consecutive images based on changes in pixels in order to identify shopping events, as described in detail hereinafter. By comparing each still image on a pixel basis to the subsequent image the analysis computer 20 is configured to determine if the images are identical or if there are differences between the images based on whether each pixel or a group of pixels in one image is different from a corresponding pixel or a corresponding group of pixels in the subsequent image.

The analysis computer 20 may be configured to categorize still images may be into different categories based on the detected changes in pixels between frames. For example, still images may be categorized, in order, into a series of groups of identical images, referred to as reference images, broken up by other groups of images that differ from the reference images, by variable amounts. These comparisons may be performed on a pixel basis, by comparing corresponding pixels or groups of pixels in each image to the reference image to detect changes in an image parameter, such as intensity, color, hue, saturation, value, luminance, and/or chrominance.

Figure 7:
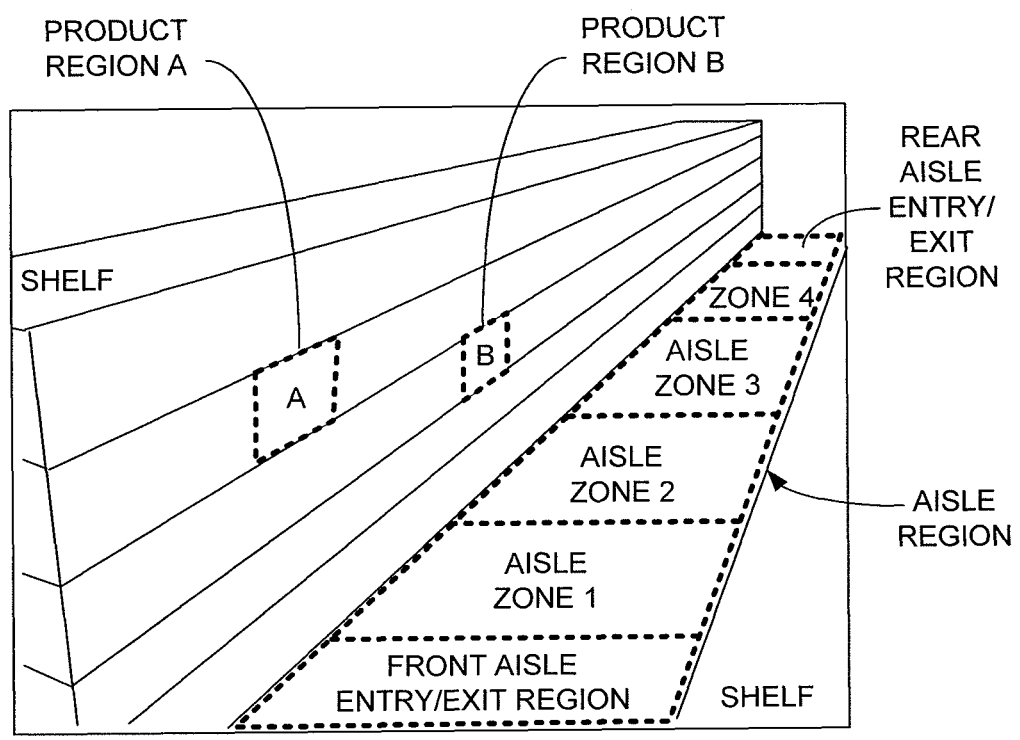
FIG. 7 is a perspective view of a monitored shopping area, illustrating product regions and aisle regions in the monitored shopping area.

Furthermore, each still image may be broken down into a pixel matrix with different regions which may be used to identify particular events, as shown in FIG. 7 and discussed below. In this example, the series of groups of identical images may be categorized or interpolated as constant-events, during which no pixel change between frames of still images is detected since no customer is visiting the monitored shopping area. As used herein the term interpolation refers to the process of inferring or approximating shopping events as occurring throughout a time period from a low frequency sample of data points in the time period. The other groups of images that do not have identical images may be categorized or interpolated as visiting events, during which pixel changes between frames of still images are detected due to customers visiting the monitored shopping area.

A threshold may be set to determine whether there is pixel change between frames, and the threshold may differ based on the area of the region of the image. Thus, for example, a smaller pixel change threshold may be applied to regions that are further from the camera and in which persons and products appear smaller. Once the still images are classified into the two categories, constant-events and visiting-events, various analyses may be performed by the analysis computer 20 to extract shopping event information. For example, by identifying the number of visiting-events that occur in any particular time period, an estimated minimum number of visitors in the field of the camera's view may be established. Further, this value can be used to determine other shopping event parameters including the visit percentage or the number of total shoppers that visit the monitored shopping area.

Furthermore, the duration of a shopping event, such as a constant-event or a visiting-event, may be determined by the analysis computer 20. The duration may be used to further classify the shopping event. For example, the total number of seconds in each of the visiting-events, namely, the number of seconds from the first still image to the last still image, obtained for example either by count or by difference in time stamps may be used to further classify the visiting-events. Based on duration of visiting-events, the visiting-events may be categorized into transitory-events and stopping-to-shop-events. The duration of transitory-events are in general shorter, since during transitory-events customers are merely passing by and do not spend a significant amount of time in the monitored shopping area. The duration of stopping-to-shop events are in general longer during transitory-events, since detailed shopping may be involved by one or more customers and the customers are spending more time in the monitored shopping area. A duration threshold may be set to differentiate transitory-events from stopping-to-shop events.

Furthermore, various other time measures, such as dwell time, which is an amount of time a shopper spent in a shopping area, and buy time, which an amount of time a shopper spent examining a product before making a purchasing decision may also be determined. In addition, these and other measures may be analyzed by time of day, day of week, etc., as desired. It should also be appreciated that a duration of each type of shopping event may be cataloged to help future analysis of the shopping events. The analysis computer 20 may be configured to perform various analyses, such as statistical analysis, of the captured still image. For example, the analysis computer 20 may be configured to identify and count the number of stopping-to-shop events. The number and/or percentage of customers who stopped to shop in the monitored shopping areas may be determined based on the number of stopping-to-shop-events occurring in a particular time period. For example, a minimum number and/or percentage of customers who stopped to shop may be estimated since each stopping-to-shop-event involves at least one customer who stopped to shop.

The analysis computer 20 may be configured to estimate the number of visiting customers visiting during a particular visiting-event based on a share and/or number of pixels of the still images that have been changed from a constant-event, such as a preceding constant-event. Alternatively, the number of visiting customers may be estimated based on pixel changes throughout the visiting-events, i.e., based on pixel changes between frames still images of the visiting-events. The visiting-event to shopping event conversion (S/N) rate may be calculated to determine the percentage of visitors that stop to shop.

Now turning to the constant-events, since visiting-events and constant-events are interspersed throughout the entire monitoring period, the total duration of the constant-events will equal the duration of the monitoring period minus the duration of the visiting-events.

By discriminating between the various constant-events, it may be identified when there is a change in pixels from one constant-event to another constant-event, such as to the next constant-event. This change may further be classified as or attributed to a purchasing-event, during which one or more customers made a purchase of an item located in the monitored shopping area. In other words, when monitoring a particular area, such as a shelf on an aisle, an identified pixel change (i.e. a purchasing-event) may represent a change in appearance of the shelf which may be interpolated as a purchase.

Referring to FIG. 7, product region A and product region B are monitored. Should the analysis computer 20 detect that a pixel change has occurred between constant-events in either of the product regions A or B, the analysis computer may determine that a purchasing-event has occurred affecting the product region in which the pixel change was detected. Purchasing-events may be used to determine values relating to purchases, such as total amount of purchases of all items displayed, total amount of purchases of a particular item, etc. Moreover, by using purchasing-events instead of a complicated time-log, the shopper behavior analysis process may be simplified.

The analysis computer 20 may further be configured to estimate how many units of a particular display item that have been removed, thus purchased, from number or share of pixels attributed to the particular display item that have been altered. Further, from the location of those pixels that are changed, the purchased product may be identified. Still further, the above purchase related analysis may be used to identify product stock-outs (i.e., an event in which a product becomes out of stock on a shelf) and/or pending product stock-outs (i.e., an event in which the number of products on a shelf drops below a threshold number, such as 1) of the particular display item, and/or providing alert, such as a timely alert, regarding the product stock-outs and/or pending product stock-outs of the particular display item, to, for example, store management, and/or to instruct store employees to engage in automated restocking of the particular items.

Figure 3:
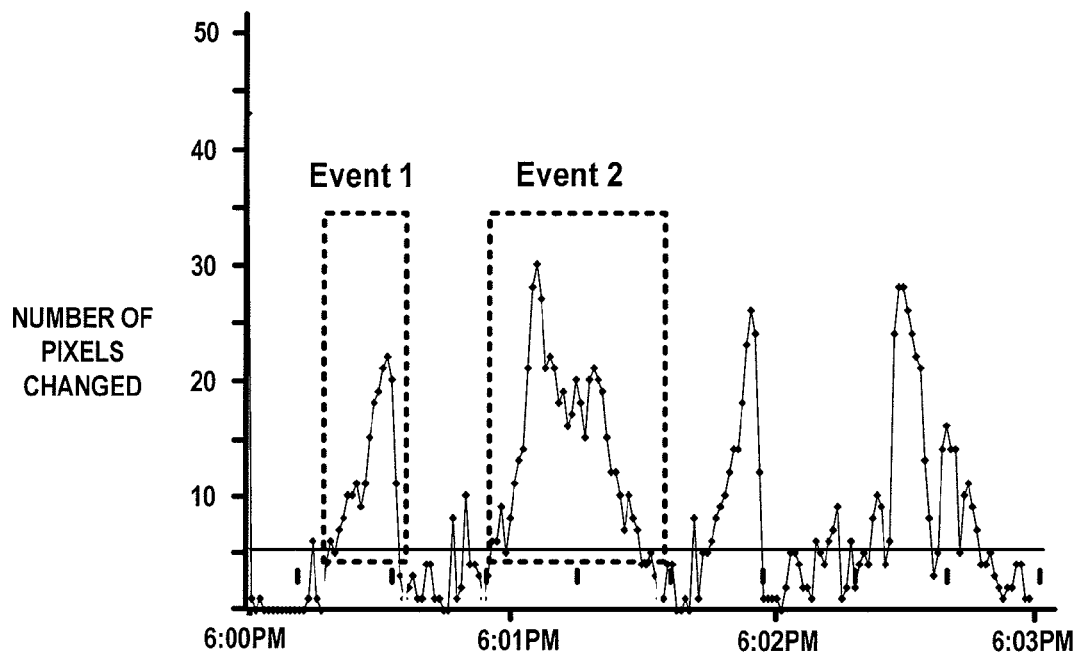
FIG. 3 is a line graph showing shopping events over a three minute time period.

Analysis computer 20 may determine entrance direction of a visiting customer visiting a visiting-event based on characteristics of a line graph of the visiting-event, as will be illustrated in detail in reference to FIG. 3 and FIG. 7. The upward slope of the graph in FIG. 3 during Event 1 indicates that a shopper is traversing from a rear to a front of an aisle, since due to camera perspective more pixels are changed between frames when the shopper is in a front aisle entry/exit region than in a rear aisle entry/exit region, as illustrated in FIG. 7. On the other hand, the downward slope of the graph in FIG. 3 during Event 2 indicates that at least one shopper is traversing from front to rear of the aisle, although in actuality this Event features two shoppers in the aisle as described in detail below. Thus, by analyzing the slope of the pixel change graphs during visiting events, the analysis computer can determine the direction of aisle traverse by a shopper.

Further, robustness of the analysis can be verified for quality control purposes, with further enhancement of understanding the relation of array statistics to shopper behavior, through the visual support of the still images, in other words by actually viewing the still images. For example, in some cases, a visiting-event is too short to represent a transit of a shopper of the cameras field of view. In one particular example, a person may wave their hand in front of the camera and trigger a short visiting-event. In such events that may not provide a clear indication of shopper behavior, the actual still image may be assessed to see what really happened in order to properly classify the event to refine the above pixel change based shopping event analysis. In yet another example, visual inspection of the actual still images may help to verify the accuracy of estimating number of customers during a visiting-event based on number or share or percentage of pixel changes from a constant event.

In some embodiments, the still image view function may be automated, so that, for example, single images or groups of images may be polled to be viewed automatically. As a particular example, one image from the center of each purchasing-event may be pulled to identify the sight demographics of the purchaser. The tagging information discussed earlier may help to facilitate or enable single images and/or groups of images of a shopping event to be viewed to assist in the analysis of the shopping event. It should be appreciated that such a process may also be performed manually by an image technician.

In some embodiments, the still image monitoring and analysis system may include an image viewing tool that allows the rapid scanning or detailed perusal of images selected by any suitable criteria the viewer may choose. The viewing tool may include a video play function of any selected event that shows for example a one second per frame selection of images consecutively of a desired event.

Figure 2:
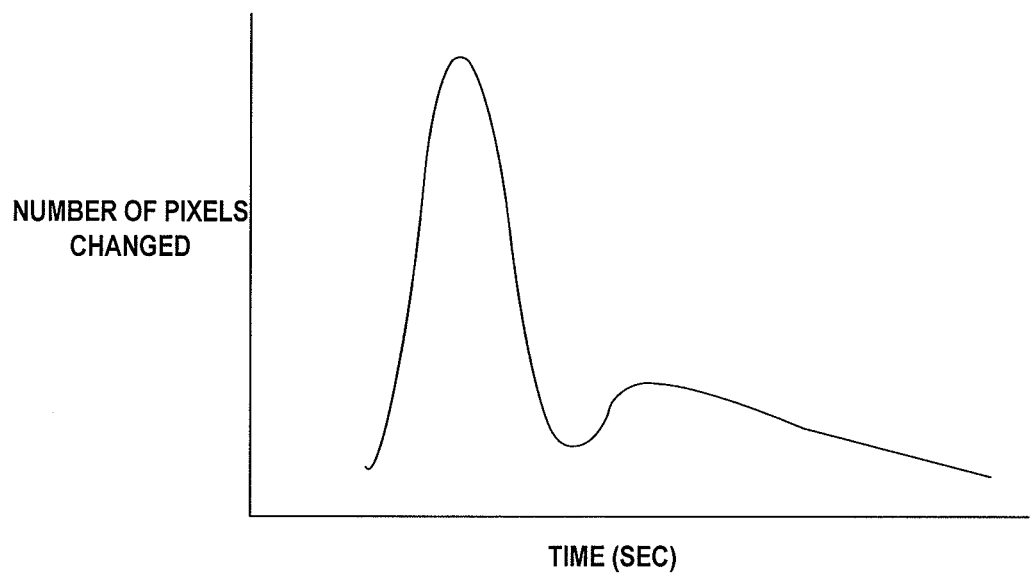
FIG. 2 is a line graph showing an example shopping event.

Referring now to FIG. 2, which is a line graph showing an example shopping event, obtained by graphing the number of pixels that have been changed during the shopping event. The first peak in this example represents a customer is passing though the monitored area. The second peak in this example represents a small body movement of the customer, for example, an extended shoulder. The presence of this second peak and/or the duration of the may indicate that the customer did not just merely visit, but also paused (shopped) at least to the extent of not passing through as quickly as a passerby. It should be noted that the above analysis may be performed automatically using a computer in a still image shopper event monitoring and analysis system according to the present disclosure.

Figure 5:
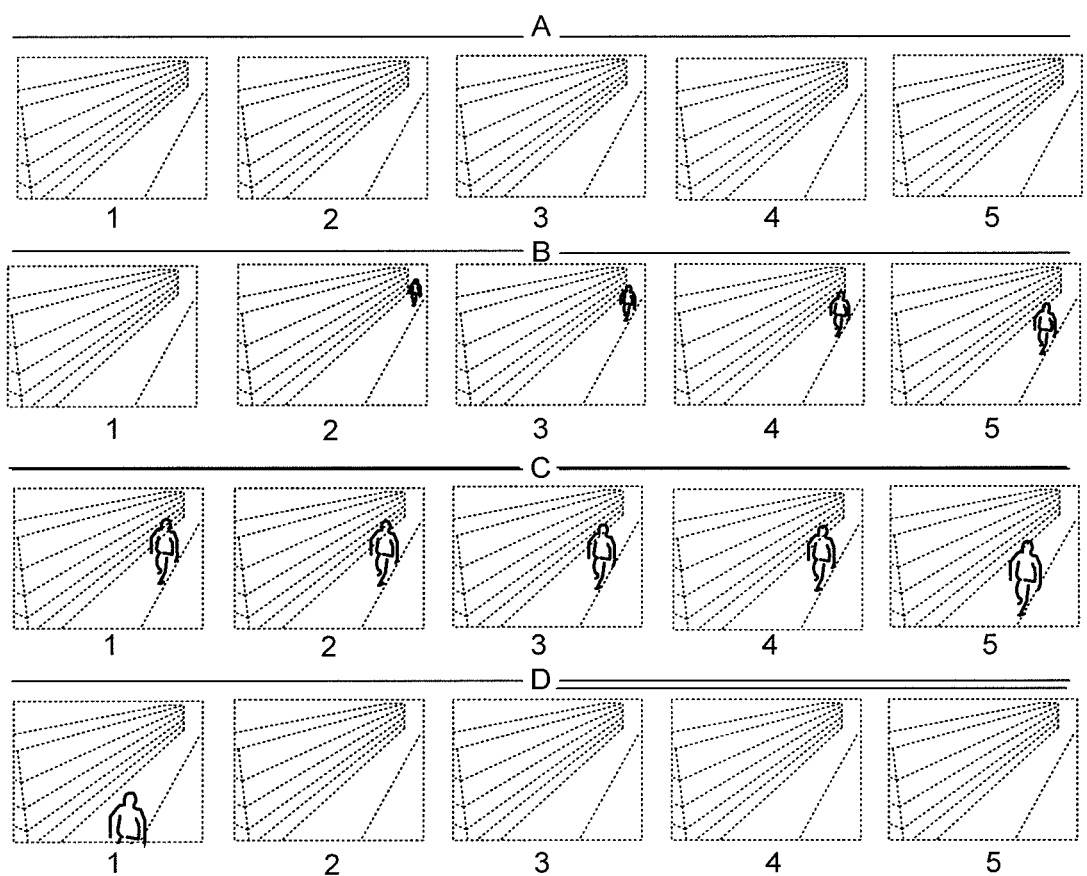
FIG. 5 illustrates a sequence of still images corresponding to the first shopping event identified in FIG. 3.
Figure 6:
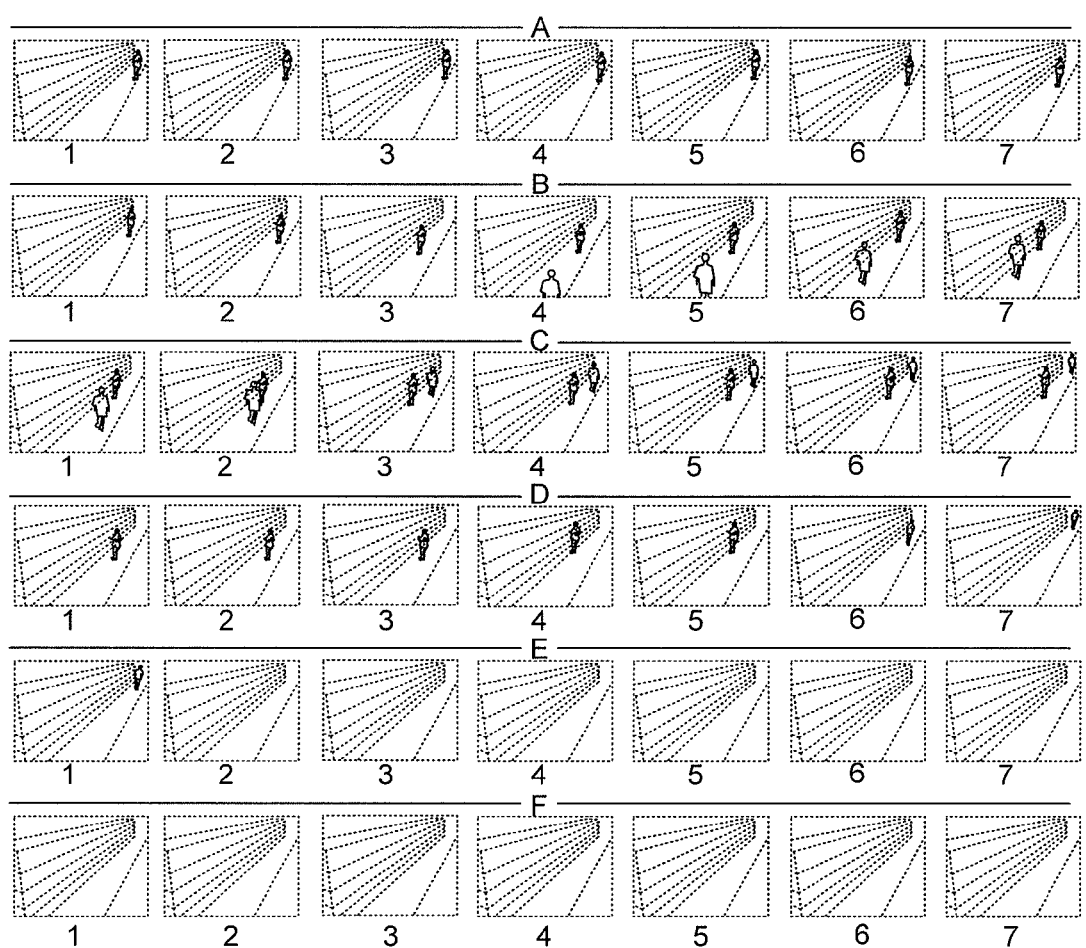
FIG. 6 illustrates a sequence of still images corresponding to the second shopping event identified in FIG. 3.

FIG. 3 shows a line graph of pixel changes for visiting-events occurring over a period of three minutes. In this example, the still images used to make the graph are taken from a section of an aisle of a grocery store. The graph is annotated to identify two events. FIGS. 5 and 6 show two series of still images that correspond to the respective events.

The first event indicates one shopper passing through the aisle, for a total of about 19 seconds, entering from the front of the aisle and exiting from the back. The front to back direction entry by the customer is apparent from the shape of the event, more specifically, a gradual increase in number of pixels changed as the shopper enters the monitored shopping area and walks towards the camera, and then a precipitous drop as they exit the image field cameras the customer pass the camera. The event identification is supported from the still images identified specifically in row C of FIG. 5. It is the apparent size of the image of the customer according to the perspective of the camera that is responsible for this phenomenon. Accordingly, camera placement may be taken into account during still image analysis.

The second event, which lasts for about 41 seconds, begins with a single shopper, who also enters from the front of the aisle, shown in row B of FIG. 6. However, about 10 seconds into the event, a second shopper begins a traverse of the aisle from the rear, shown in row C of FIG. 6. With two shoppers in the aisle a larger differential in pixels occurs. In this case, the exit from the aisle is tapering, as both shoppers ultimately exit from the front of the aisle.

It should be appreciated that determinations may be made with a reasonable degree of reliability from the characteristics of line graphs of various shopping events, which may be cataloged by comparing different line graph curve characteristics to visual inspection. It should also be appreciated, that having less than a full aisle in the view of the camera (for example, an eight foot section of the aisle) may increase the reliability of the statistics.

It should also be appreciated that a catalog of reference shopping events may be identified, for example through visual inspection by an image technician of samples of reference still images during known shopping events. The technician may identify the type of line graph curve characteristics and/or other type of statistical data extrapolated from the reference still images, and may also identify corresponding reference pixel characteristics that are indicative of those events. This catalog may be used to facilitate future computer analysis of the captured still images. For example, these reference pixel characteristics identified through empirical data may serve as a sample data set against which other pixel data is compared, in order to statistically identify shopping events in the other pixel data, even where the other pixel data is not viewed by an image technician. This may save time and costs over prior methods that relied on human inspection of images.

Figure 4:
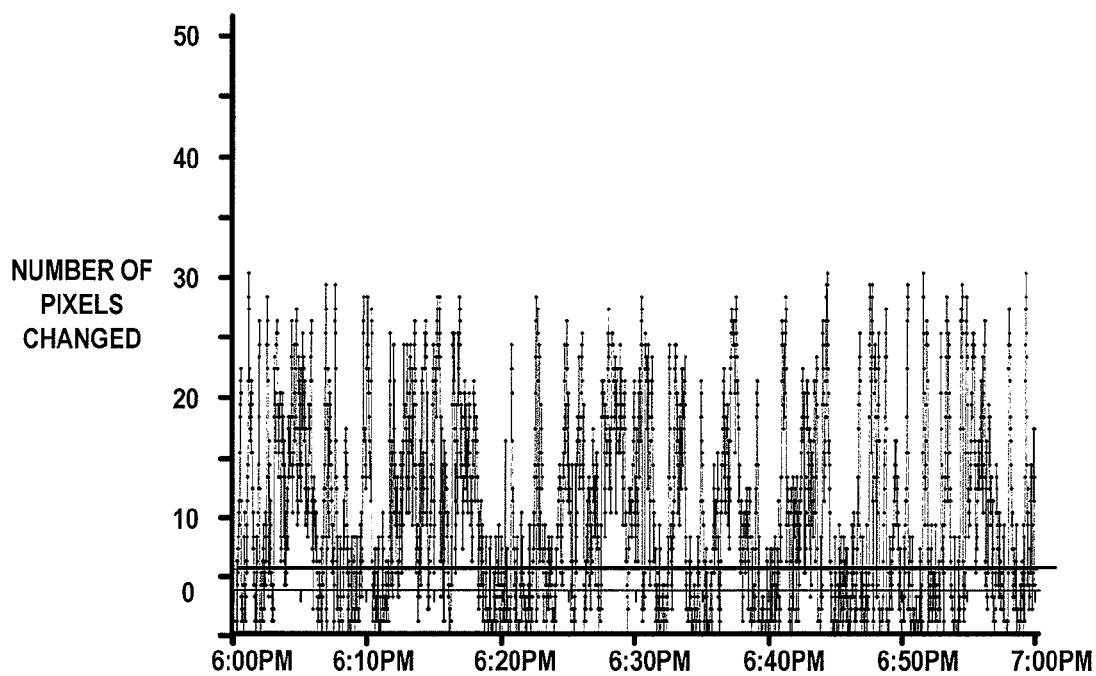
FIG. 4 is a line graph showing shopping events over a one hour time period.

FIG. 4 shows a line graph of pixel changes or visiting-events graphed over a period of one hour. In this example, the still images used to make the graph are taken from the same section of the aisle of the grocery store as FIG. 3. Each of the spikes in pixel change may be recognized and statistically classified according to the method described above to provide an accurate picture of shopping behavior in this aisle.

FIG. 7 shows a monitored shopping area, including product region A and product region B, and an aisle region divided into a front entry/exit region, a rear entry/exit region, and four aisle zones. As described above, the analysis computer may be configured to determine changes in pixels or pixel groups in successive images to identify shopping events that occurred in the product regions or aisle region, and further may monitor different zones of a region to identify events that occurred in each zone. Thus, the analysis computer 20 may configured to count the number of entrances and exits made to the aisle region by determining how many visiting events occur in each of the front and rear entry/exit zones. In addition, the analysis computer may be configured to determine visit-events, stopping-to-shop events, and purchasing-events that occur in a particular zone of an aisle region that is adjacent a product region, for example.

It should be appreciated that the still image monitoring system and method do not require recognition of image features within a still image, but instead is based on recognizing the magnitude and timing of changes between still images from changes in pixels. However, image recognition may be used to further refine identification and categorization of shopping events and shopper behavior.

It should also be noted that a wide variety of information can be obtained in this manner, without requiring actual image recognition, which reduces the amount of data flow and the cost associated with analyzing large amount of data and allows shopping behavior analysis be carried out in a simple and cost effective manner.

Further, such a system may be modular, in other words, the system may be adaptable so that any number of cameras may be installed in a particular location and any number of locations may be connected on network. It should be appreciated that the method and system may be applied to various other applications in order to categorize specific events and behavior.

Figure 8:
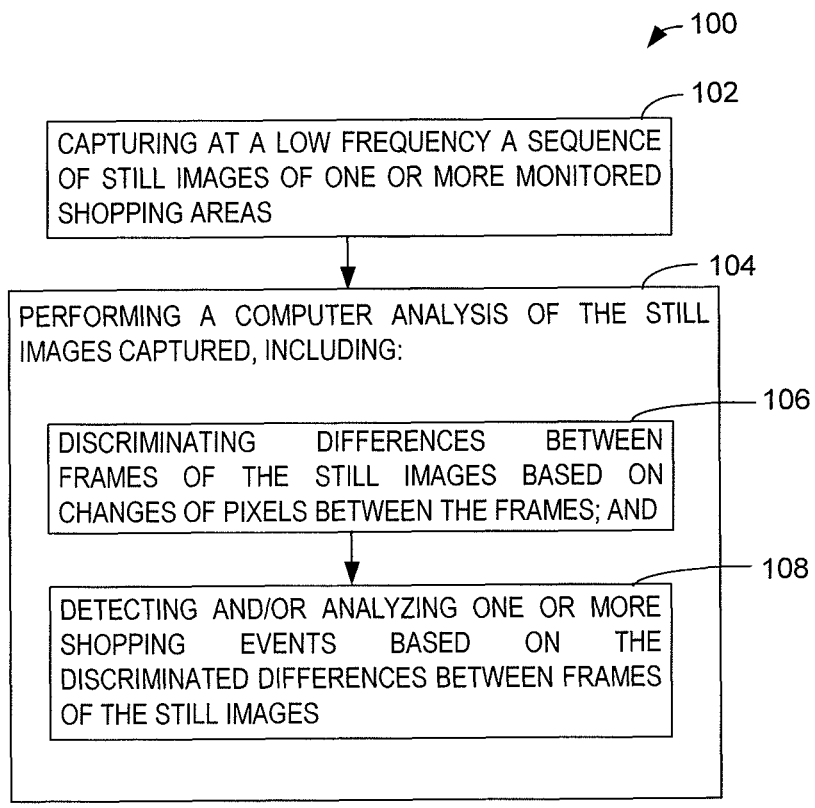
FIG. 8 is a flowchart of a method according to one embodiment.

FIG. 8 illustrates an embodiment of a still image shopping event analysis method 100 that may be performed by the above described system 10 or other suitable hardware. Method 100 includes, at 102, capturing at a low frequency a sequence of still images of one or more monitored shopping areas. At 104, the method includes performing a computer analysis of the still images captured. As illustrated at 106, performing the computer analysis may include discriminating differences between frames of the still images based on changes of pixels between the frames. And, as illustrated at 108, performing the computer analysis may further include detecting and/or analyzing one or more shopping events based on the discriminated differences between frames of the still images.

As described above, performing the computer analysis of the still images may further include categorizing still images into different categories based on changes in pixels between frames. These different categories may include constant-events during which no customer is visiting the monitored shopping area when changes in pixels between frames are below a threshold, and visiting-events during which one or more customers are visiting the monitored shopping area when changes in pixels between frames are above a threshold.

Further, performing the computer analysis of the still images may further include estimating a number and/or percentage of customers visited the monitored shopping area based on the number of visiting-events identified in a particular time period.

In addition, performing the computer analysis may further include determining an entrance direction of a visiting customer during a visiting-event based on characteristics of a line graph of the visiting-event the line graph of the visiting-event plots differences between frames Performing the computer analysis of the still images may further includes, based on duration of the visiting-events categorizing the visiting-events into transitory-events and stopping-to-shop-events, wherein during each of the visiting-events, one or more customers are passing the monitored shopping areas, and during each of the stopping-to-shop-events, one or more customers visiting the monitored shopping areas also stopped to shop.

Performing the computer analysis of the still images may further include estimating a number and/or a percentage of customers who stopped to shop in the monitored shopping areas based on number of stopping-to-shop-events occurring in a particular time period.

Performing the computer analysis of the still images may further include estimating number of visiting customers during a visiting-event based on a share of and/or number of pixels of the still images that has been changed from the still images of a constant-event, and/or the pixel changes throughout the visiting-event.

Performing the computer analysis of the still images may further include interpolating changes in pixels attributed to a change in appearance of a product region of the monitored shopping area between two constant-events as an occurrence of a purchasing-event, during which a purchase of an item located in the product region has been made by a visiting customer.

Performing the computer analysis of the still images may further include identifying an item and/or product being purchased based on position of pixels changed.

Performing the computer analysis of the still images may further include calculating total number of the items being purchased based on the number of purchasing-events during which customers have purchased the item and/or product.

Performing the computer analysis further include identifying product stock-outs and/or pending product stock-outs of the item, and/or providing alerts regarding product stock-outs and/or pending product stock-outs of the item based on the calculated total number of the items being purchased.

Performing the computer analysis of the still images may further include identifying a number of purchasing-events that occurred in a particular time period, and estimating a number and/or percentage of customers visiting the monitored shopping area also made a purchase of an item of located in the monitored shopping area based on the number of purchasing-events.

It will be appreciated that the above described systems and methods may be used to statistically analyze pixel data from monitored shopping areas to identify shopping events occurring of a period of time, without requiring that video of the monitored shopping area be viewed by a human technician, and also without requiring processor-intensive and expensive image processing techniques to be employed to recognize patterns in video of the monitored shopping area.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A still image shopping event analysis method, comprising:
   capturing at a low frequency a sequence of still images from a fixed position camera of one or more monitored stationary shelves; and
   performing, by an analysis computer, an analysis of the still images captured, including:
      converting each still image into a pixel matrix comprising, for each pixel, only a pixel luminosity value such that each pixel matrix is lacking information usable to reconstruct the pixel matrix back to a displayable image;
      breaking down each pixel matrix into different regions, said regions comprising an aisle region having a plurality of zones, a shelf region, and a plurality of product regions in the shelf region, each product region having an associated product;
      discriminating differences between frames of the still images based on changes in pixels between the frames;
      detecting one or more shopping events occurring in a zone of the aisle region that is adjacent a first product region of the shelf region based on the discriminated pixel differences between frames of the still images alone without recognition of image features within the still images;
      categorizing the one or more shopping events, based on changes in pixels between frames, into constant-events during which no customer is visiting the zone of the aisle region adjacent the first product region when changes in pixels in the zone between frames are below a threshold, and visiting-events during which one or more customers are visiting the zone of the aisle region adjacent the first product region when changes in pixels in the zone between frames are above a threshold;
      detecting a purchasing-event, in which a purchase of a product located in the first product region has been made by a visiting customer during a visiting-event, by comparing a first frame captured during a constant-event preceding the visiting-event to a second frame captured during the constant-event following the visiting-event and detecting changes in pixels of the first product region between the first frame and the second frame, the changes in pixels indicating that the product from the first product region has been removed from the shelf region during the purchasing-event between the first frame and the second frame, the detecting being performed based on changes in pixels alone without recognition of image features within the still images, wherein the product that was removed during the purchasing-event is identified based upon the location of the changed pixels in the product region.

2. The method of claim 1, wherein the monitored stationary shelves include one or more areas of a grocery store, pharmacy, fresh meat counter, and/or deli counter.

3. The method of claim 1, wherein the still images are captured using one or more power over Ethernet (POE) cameras that are configured to snap still images at a desired rate that is lower than a video frame rate.

4. The method of claim 1, wherein the computer analysis is carried out by an analysis computer, and the method further comprises transmitting the still images to the analysis computer via a wireless virtual private network (VPN) over an internet, prior to performing the computer analysis.

5. The method of claim 1, wherein performing the computer analysis of the still images further includes measuring duration of the one or more shopping events.

6. The method of claim 1, wherein performing the computer analysis of the still images further includes estimating a number and/or percentage of customers who have visited the zone of the aisle region of the monitored stationary shelves based on a number of visiting-events identified in a particular time period.

7. The method of claim 1, wherein performing the computer analysis further includes determining an entrance direction of a visiting customer during the visiting-event based on characteristics of a line graph of the visiting-event, wherein the line graph of the visiting-event plots differences between frames.

8. The method of claim 1, further comprising:
   categorizing the visiting-events, based on duration of the visiting-events, into transitory-events and stopping-to-shop-events, wherein during each of the visiting-events, one or more customers are passing the monitored stationary shelves, and during each of the stopping-to-shop-events, one or more customers visiting a zone of an aisle region of the monitored stationary shelves also stopped to shop;
   wherein performing the computer analysis of the still images further includes estimating a number and/or a percentage of customers who stopped to shop at the monitored stationary shelves based on a number of stopping-to-shop-events occurring in a particular time period.

9. The method of claim 1, wherein performing the computer analysis of the still images further includes estimating a number of visiting customers during a visiting-event based on a share of and/or number of pixels of the still images that have been changed from the still images of the constant-event, and/or changes in pixels throughout the visiting-event.

10. The method of claim 1, wherein performing the computer analysis of the still images further includes calculating a total number of the products being purchased based on a number of purchasing-events during which customers have purchased the product.

11. The method of claim 10, wherein performing the computer analysis further includes identifying product stock-outs and/or pending product stock-outs of the product, and/or providing alerts regarding product stock-outs and/or pending product stock-outs of the product based on the calculated total number of the products being purchased.

12. The method of claim 1, wherein performing the computer analysis of the still images further includes identifying a number of purchasing-events that occurred in a particular time period, and estimating a number and/or percentage of customers visiting the monitored stationary shelves who also made a purchase of an item located in the monitored stationary shelves based on the number of purchasing-events.

13. The method of claim 1, wherein the method further includes tagging the still images with tagging information and using the tagging information to assist the computer analysis of the still images.

14. The method of claim 13, wherein the tagging information enables single images and/or groups of images of the shopping event to be viewed to assist in the computer analysis of the shopping event.

15. A still image shopping event analysis system, comprising:
    a fixed position camera configured to capture at a low frequency a sequence of pixel matrices each comprising pixel array data captured while imaging one or more monitored stationary shelves, wherein the pixel array data comprises, for each pixel, information usable for statistical analysis but lacking information usable to construct the pixel matrix to a display image; and
    a data analysis module executed by an analysis computer, configured to:
        break down each pixel matrix into different regions, said regions comprising an aisle region having a plurality of zones, a shelf region, and product regions in the shelf region, each product region having an associated product;
        perform computer analysis of the pixel matrices to discriminate differences between the pixel matrices based on changes in pixels;
        detect one or more shopping events occurring in a zone of the aisle region that is adjacent a first product region of the shelf region based on the discriminated pixel differences between the pixel matrices;
        categorize the shopping events, based on changes in pixels between pixel matrices, into constant-events during which no customer is visiting the zone of the aisle region that is adjacent the first product region when changes in pixels in the zone between frames are below a threshold, and visiting-events during which one or more customers are visiting the zone of the aisle region that is adjacent the first product region when changes in pixels in the zone between pixel matrices are above a threshold;
        detect a purchasing-event, in which a purchase of a product located in the first product region has been made by a visiting customer during a visiting-event, by comparing a first pixel matrix captured during a constant-event preceding the visiting-event to a second pixel matrix captured during a constant-event following the visiting-event and detecting changes in pixels of the first product region between the first pixel matrix and the second pixel matrix, the changes in pixels indicating that the product from the first product region has been removed from the shelf region during the purchasing-event between the first pixel matrix and the second pixel matrix, the detecting being performed based on changes in pixels alone without recognition of image features, wherein a product that was removed during the purchasing-event is identified based upon a location of the changed pixels in the product region.

16. The still image shopping event analysis system of claim 15, further comprising a still image tagging module configured to tag the pixel matrices to assist in the computer analysis of the still pixel matrices.

* * * * *